(12) United States Patent
Barsotti et al.

(10) Patent No.: US 12,497,335 B2
(45) Date of Patent: Dec. 16, 2025

(54) HIGH TEMPERATURE COMPOSITES AND METHODS FOR PREPARING HIGH TEMPERATURE COMPOSITES

(71) Applicant: Arkema France, Colombes (FR)

(72) Inventors: Robert J. Barsotti, Newtown Square, PA (US); Roderick Reber, Philadelphia, PA (US); Mary K. Calvin, Havertown, PA (US); Stephen G. Dipietro, Amherst, NH (US)

(73) Assignee: ARKEMA FRANCE, Puteaux (FR)

( * ) Notice: Subject to any disclaimer, the term of this patent is extended or adjusted under 35 U.S.C. 154(b) by 965 days.

(21) Appl. No.: 17/530,970

(22) Filed: Nov. 19, 2021

(65) Prior Publication Data
US 2023/0150887 A1    May 18, 2023

(30) Foreign Application Priority Data
Nov. 15, 2021 (EP) .................................. 21306580

(51) Int. Cl.
*C04B 35/83* (2006.01)
*C04B 35/628* (2006.01)
(Continued)

(52) U.S. Cl.
CPC ........ *C04B 35/83* (2013.01); *C04B 35/62873* (2013.01); *C04B 35/62886* (2013.01);
(Continued)

(58) Field of Classification Search
CPC ... C04B 35/521; C04B 35/524; C04B 35/528; C04B 35/532
See application file for complete search history.

(56) References Cited

U.S. PATENT DOCUMENTS 5,106,680 A * 4/1992 King .................. C08K 9/04
156/181
5,965,268 A * 10/1999 Sastri ................ C04B 35/62645
252/502
(Continued)

FOREIGN PATENT DOCUMENTS

JP    H069270 A * 1/1994 ........... C04B 35/645

OTHER PUBLICATIONS

Machine translation of JP-H069270-A, retrieved from USPTO database Aug. 28, 2025 (Year: 2025).*
(Continued)

*Primary Examiner* — Timothy Kennedy
(74) *Attorney, Agent, or Firm* — Boone IP Law (57) ABSTRACT

A method for making a carbon carbon, carbon ceramic matrix, or carbon silica composite, comprising melt processing a resin comprising a polyaryletherketone (PAEK) and at least one reinforcing additive to make a precursor part, pyrolyzing the precursor part to make a pyrolyzed part, infusing a liquid second resin into the pyrolyzed part to make an infused part, and pyrolyzing the infused part. Other methods comprise processing aligned reinforcing additives and a resin comprising a PAEK to make an aligned reinforcing additives PAEK, aligned 1-2 dimensional flake material, or aligned 1-2 dimensional platelet material, to create a fabric, prepreg or tape comprising the aligned reinforcing additives and impregnated PAEK. Other methods comprise impregnating continuous fiber tape or fabric with a resin comprising PAEK and at least one reinforcing additive or co-weaving a continuous fiber or fabric with a PAEK fiber comprising PAEK and at least one reinforcing additive.

18 Claims, 1 Drawing Sheet

(51) Int. Cl.
*C04B 35/64* (2006.01)
*C04B 35/657* (2006.01)

(52) U.S. Cl.
CPC .......... *C04B 35/64* (2013.01); *C04B 35/657* (2013.01); *C04B 2235/422* (2013.01); *C04B 2235/48* (2013.01); *C04B 2235/5248* (2013.01); *C04B 2235/5256* (2013.01); *C04B 2235/616* (2013.01)

(56) References Cited

U.S. PATENT DOCUMENTS

| | | | |
|---|---|---|---|
| 10,669,659 B2 | 6/2020 | Tierney et al. | |
| 2004/0155382 A1* | 8/2004 | Huang | C04B 41/009 264/29.1 |
| 2008/0025906 A1 | 1/2008 | Lin et al. | |
| 2011/0097575 A1 | 4/2011 | Pratte | |
| 2011/0124253 A1 | 5/2011 | Shah et al. | |
| 2017/0313050 A1 | 11/2017 | Defelice | |
| 2019/0048500 A1 | 2/2019 | Tierney et al. | |
| 2019/0322804 A1* | 10/2019 | Louis | C08K 3/013 |
| 2021/0017089 A1 | 1/2021 | Thrasher et al. | |

OTHER PUBLICATIONS

Extended European Search Report dated Apr. 19, 2022, issued by the European Patent Office in corresponding European Application No. 21306580.8-1108, (11 pages).

Muhammed, F. et al: "Influence of material and process parameters on microstructure evolution during the fabrication of carbon-carbon composites: a review", Journal of Material Science, vol. 56, No. 32, Aug. 12, 2021, pp. 17877-17914.

Goncalves, J. et al."Electrically Conductive Polyetheretherketone Nanocomposite Filaments: From Production to Fused Deposition Modeling" Polymers, 2018, vol. 10, No. 925, 20 pages.

International Search Report issued on Feb. 7, 2023 by the European Patent Office Office in corresponding PCT Patent Application No. PCT/US2022/049962 (5 pages).

Written Opinion issued on Apr. 2005 by the European Patent Office Office in corresponding PCT Patent Application No. PCT/US2022/049962. (8 pages).

International Search Report issued on Feb. 27, 2023 by the European Patent Office Office in corresponding PCT Patent Application No. PCT/IB2022/000667. (6 pages).

Written Opinion issued on Apr. 2005 by the European Patent Office Office in corresponding PCT Patent Application No. PCT/IB2022/000667. (9 pages).

Pérez-Martín, H. et al., "Crystallinity studies of PEKK and carbon fibre/PEKK composites: A review", Composites Part B, Jul. 8, 2021, vol. 223, Elsevier Ltd., Amsterdam, NL. (26 pages).

U.S. Appl. No. 18/176,639, Robert J. Barsotti, filed Mar. 1, 2023.
U.S. Appl. No. 18/706,968, Robert J. Barsotti, filed May 2, 2024.
U.S. Appl. No. 18/707,026, Robert J. Barsotti, filed May 2, 2024.

* cited by examiner

HIGH TEMPERATURE COMPOSITES AND METHODS FOR PREPARING HIGH TEMPERATURE COMPOSITES

CROSS REFERENCE TO RELATED APPLICATIONS

The present application claims the benefit of European Application No. 21306580, filed on Nov. 15, 2021. The entire contents of European Application No. 21306580 are hereby incorporated herein by reference in their entirety.

FIELD

The present invention relates to high temperature composites, such as carbon carbon composites, carbon ceramic matrix composites, and carbon silica composites. The present invention also relates to methods for preparing high temperature composites, such as carbon carbon composites, carbon ceramic matrix composites, and carbon silica composites.

BACKGROUND

High temperature composites such as carbon carbon composites, carbon ceramic matrix composites, and carbon silica composites, can be useful in areas such as hypersonics, solid/liquid rocket propulsion, and other defense/aerospace applications where ultra high temperature properties are required. Industrial applications can include metal and glass processing and concentrated photovoltaics.

High temperature composites materials, including carbon composites, carbon ceramic matrix composites and carbon silica composites have been traditionally made utilizing pitch or thermoset resins such as phenolic (such as Hexion Durite SC1008) or epoxy. Precursor parts utilizing these thermoset composites are made by a "hand lay-up" requiring significant manual labor to place thermoset prepregs down. In addition to the time and cost of such labor, this manual effort also leads to human error and low quality in precursor parts. Thermoplastic composite materials have an advantage in their ability to be processed by automated methods, including automated tape placement and 3D printing. Thermoplastic tape has additional advantages versus thermoset prepregs in that refrigerated shipment and storage is typically not required.

A pyrolysis step (thermal treatment) can be used in the production of carbon carbon composites, carbon ceramic matrix composites, and carbon silica composites. The pyrolysis can be implemented to eliminate volatiles and/or non-carbon organic elements in the composites (such as in the polymer matrix) and retain the carbon elements.

But pyrolysis steps can sometimes take hundreds of hours, with an additional day for graphitization. This process is then repeated several times, leading to long lead times for finished parts. Each additional re-infusion plus pyrolysis cycle is labor intensive and time consuming. Additionally, at each cycle there is the possibility that errors or defects could lead to an unacceptable final object. Therefore, it is desirable to reduce the number of cycles required to achieve a fully dense part. Higher char yields allow this process to be shortened because the part is closer to fully solid after the first pyrolysis cycle thereby lessening the number of needed cycles. Typically phenolic based solutions can only provide char yields of 50-70%. Many other (non PAEK) thermoplastic solutions provide char yields of less than 65%.

The inventions described herein, which utilize polyaryletherketones (PAEK) and especially polyetherketoneketones (PEKK), unexpectedly overcome these problems. PAEKs, including PEKK, are high performance semi-crystalline polymers having high melting points, extremely high thermal properties, outstanding chemical resistance and flame resistance, and high modulus and strength. By following embodiments of the invention, it is possible to make carbon carbon composites, carbon ceramic matrix composites, and carbon silica composites using a thermoplastic resin. The thermoplastic resin allows automated methods to make precursors parts thereby saving time and money while improving quality and having unexpectedly high char yields, such as char yields from 70% to 80%, up to 85%, up to 90%, and even up to 95% and higher. Pyrolysis cycles can be sped up as the PAEK materials show a single decomposition point thereby alleviating the need for long hold cycles at multiple temperatures often seen with thermoset resins. The surprisingly high char yields also enable fewer pyrolysis/infusion steps than other methods, thereby savings days and even weeks of production time. In certain embodiments, the carbon carbon composites, carbon ceramic matrix composites, and carbon silica composites can be made in a total process time of less than about 50 h, 60 h, 70 h, 80 h, 90 h, 100 h, 110 h, 120 h, 130 h, 140 h, 150 h, 160 h, 170 h, 180 h, 190 h, 200 h, or any ranges between the specified values.

Applicant also has surprisingly discovered that according to the embodiments of the invention, it is possible to utilize carbon carbon composite, carbon ceramic matrix composite, and carbon silica composite precursors that combine the advantages of easy processability, high char yields, and high mechanical performance.

SUMMARY

The invention is directed to a method for making a high temperature composite, which is a carbon carbon composite, a carbon ceramic matrix composite, or a carbon silica composite, comprising: a. making a precursor part from a resin comprising a polyaryletherketone (PAEK) and at least one reinforcing additive; b. pyrolyzing the precursor part to a pyrolyzed part; c. infusing a liquid second resin into the pyrolyzed part to make an infused part; d. pyrolyzing the infused part to make the carbon carbon composite, the carbon ceramic matrix composite, or the carbon silica composite, and e. optionally repeating steps c. through d. one or more times. In one embodiment of the invention, the PAEK comprises one or more of polyetherketoneketone (PEKK), polyetheretherketone (PEEK), polyetheretherketone-poly(ether diphenyl ether ketone) (PEEK-PEDEK), polyetherketone (PEK) and polyetherketoneketoneketone (PEKEKK), preferably PEKK. In one embodiment of the invention, during the pyrolyzing, a temperature within a chamber increases to a peak temperature of about 1000° C. or more, said temperature within the chamber increases one or more times at a rate from 1° C./h to about 20° C./h during said pyrolyzing, and optionally said pyrolyzing is maintained for a period of time at one or more temperatures. In one embodiment of the invention, the liquid second resin comprises one or more of pitch, benzoxazines, furfural, polyester, vinylester, acrylic, and phenolics, preferably pitch and/or phenolics. In one embodiment of the invention, the precursor part is made by melt processing the resin comprising a polyaryletherketone (PAEK) and the at least one reinforcing additive. The melt processing may comprise one or more of injection molding, extrusion, roto-molding, compression molding, pultrusion, filament winding, and fused filament fabrication printing.

The invention is also directed to an embodiment whereby the precursor part of step a. is made by: a1) impregnating a continuous fiber tape or fabric with the resin comprising a polyaryletherketone (PAEK) and the at least one reinforcing additive to make a filled PAEK tape or fabric or, co-weaving a continuous fiber or fabric with a PAEK fiber comprising PAEK and the at least one reinforcing additive to make a filled co-woven PAEK fiber or fabric; and a2) processing the filled PAEK tape or fabric or co-woven PAEK fiber or fabric via one or more the following methods: hand-layup, automated tape placement, 3D printing, filament winding, needle punching, and other methods of Z-axis reinforcement followed by one or more compression molding, vacuum bag consolidation, autoclave consolidation, and in-situ consolidation, to make the precursor part. In another embodiment the precursor part of step a. is made by: a1) processing aligned reinforcing additives and the resin comprising a polyaryletherketone (PAEK) to make an aligned reinforcing additives PAEK, aligned 1-2 dimensional flake material, or aligned 1-2 dimensional platelet material, to make a fabric, prepreg, or tape comprising the aligned reinforcing additives and impregnated PAEK; and a2) processing the PAEK tape, prepreg, or fabric via one or more of the following methods: hand-layup, automated tape placement, 3D printing, filament winding, needle punching and other methods of Z-axis reinforcement followed by one or more of compression molding, vacuum bag consolidation, autoclave consolidation, and in-situ consolidation to make the precursor part. The reinforcing additive may comprise one or more of a carbonaceous additive, a chopped fiber, an inorganic additive, or mixtures thereof. The reinforcing additive may comprise a carbonaceous additive being one or more of carbon fiber, carbon nanotubes, graphite, graphene, carbon whisker, a fullerene, carbon black, carbon flake, buckyballs and mixtures thereof. The reinforcing additive may comprise a chopped fiber being one or more of carbon, glass, silica, boron, natural fibers, polymeric fibers and mixtures thereof. The reinforcing additive may comprise an inorganic additive being one or more of a group IV, V, or VI carbide, silicide, boride, or nitride, and/or ceramic whiskers. The precursor part may comprise a dispersing agent being an organosilicate, oganozirconate, organoaluminate or oraganotitanate. The reinforcement additive is aligned by shear from the melt processing. The continuous fiber or fabric may comprise carbon fiber. The aligned reinforcing additives are made by stretching unidirectional tape until fibers within the aligned reinforcing additives are broken, subjecting the fibers within the aligned reinforcing additives to fluid flow to align the fibers, or subjecting the fibers within the aligned reinforcing additives to electro-magnetic fields to align the fibers. The invention further relates to a carbon carbon composite, carbon ceramic matrix composite, or carbon silica composite made by the methods described and claimed herein.

DETAILED DESCRIPTION

Embodiments of the disclosure relate to methods for preparing high temperature composites, such as carbon carbon composites, carbon ceramic matrix composites, and carbon silica composites. Embodiments of the disclosure also relate to carbon carbon composites, carbon ceramic matrix composites, and carbon silica composites made by the disclosed methods.

As used herein, the term "about" means±10% of the noted value. By way of example only, at least "about 50 percent" could include from at least 45 percent to and including at least 55 percent.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "aligned" means where >75% of objects have at least one of their major axis oriented)(±5° in the same direction, as measured using images from optical microscopy of cross sections of the composites.

As used herein, the term "char yield" refers to residual carbon content measured by weight remaining after pyrolysis, and can be determined as set forth in the Example herein.

As used herein in the context of the composite, the term "% solid" means the percent (%) of density of pyrolyzed part compared to a theoretical fully dense part containing no vacancies or voids. The density of the fully dense part can be calculated by the Rule of mixtures of the matrix material (carbon or ceramic) and the fibrous material (glass or carbon).

$$D = d1a + d2(1-a)$$

Where
$D$=density of the fully dense part
$d1$=density of the fibrous material (glass or carbon)
$a$=weight fraction of the fibrous material (glass or carbon)
$d2$=density of the matrix material (carbon or ceramic)
The density of the pyrolyzed part can be experimentally measured by dividing its mass by its volume.

As used herein, the term "composite" means material comprising at least two different and/or distinct components. For example and without limiting, carbon-carbon composites may comprise a carbon matrix (e.g., graphitic) with carbon fibers. A carbon ceramic matrix composite may comprise a ceramic matrix (e.g., SiC) with carbon. A carbon silica composite can comprise a carbon (typically graphitic) matrix with glass/silica fibers.

As used herein, the term "pyrolyzing" means to enact a chemical change to a material via the application of heat, causing some, substantially all, or all non-carbon or non-inorganic elements of the materials to volatize away.

As used herein, the term "infuse" (or "infusing") means to cause a matrix to be penetrated with a liquid resin, and can fill in voids or vacancies.

As used herein, the term "chopped" refers to fibers that are not continuous and have lengths of about <5 mm, about ≤10 mm, about ≤15 mm, or about ≤20 mm.

Method Comprising Melt Processing

In certain embodiments, the present disclosure is directed to a method for preparing a carbon carbon-composite, a carbon ceramic matrix composite, or a carbon silica composite.

In certain embodiments, the method for preparing a carbon-carbon composite, a carbon ceramic matrix composite, or a carbon silica composite comprises:

a. making a precursor part from a a resin comprising a polyaryletherketone (PAEK) and at least one reinforcing additive,
b. pyrolyzing the precursor part to make a pyrolyzed part,
c. infusing a liquid second resin into the pyrolyzed part to make an infused part, and
d. pyrolyzing the infused part to make the carbon-carbon composite, the carbon ceramic matrix composite, or the carbon silica composite, and
e. optionally repeating steps (c) through (d) one or more times.

In certain embodiments, the present disclosure is directed to the carbon-carbon composite, carbon ceramic matrix composite, or carbon silica composite made by the method above.

In certain embodiments, the method can comprise making a precursor part by melt processing. In certain embodiments, the melt processing can be one or more of injection molding, extrusion, roto-molding, compression molding, pultrusion, filament winding and fused filament fabrication printing. In certain embodiments, the melt processing can optionally be followed by melt forming, such as thermoforming or rod bending.

In certain embodiments, the PAEK can be one or more of polyetherketoneketone (PEKK), polyetheretherketone (PEEK), polyetheretherketone-poly(ether diphenyl ether ketone) (PEEK-PEDEK), polyetherketone (PEK) and polyetherketonetherketoneketone (PEKEKK). In certain embodiments, the PAEK can be PEKK.

In one embodiment, the poly(aryl ketone) comprises, consists essentially of, or consists of polyetherketoneketone (PEKK). Polyetherketoneketones suitable for use in the present invention may comprise or consist essentially of repeating units represented by the following formulas I and II:

I

II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio can be easily varied as can be desired to achieve a certain set of properties, e.g., by varying the relative amounts of the different monomers used to make the polyetherketoneketone.

Generally speaking, a polyetherketoneketone having a relatively high Formula I:Formula II ratio will be more crystalline than a polyetherketoneketone having a lower Formula I:Formula II ratio. Thus, the T:I ratio can be adjusted to provide an amorphous (non-crystalline) polyetherketoneketone or a more crystalline polyetherketoneketone, as desired. In one embodiment, a polyetherketoneketone having a T:I isomer ratio of from about 50:50 to about 90:10 can be employed. In some embodiments polyetherketoneketones can have a T:I isomer ratio of from about 55:45 to about 85:15, from about 60:40 to about 80:20, from about 65:35 to about 75:25, about 70:30, or at any ranges between the specified ranges.

Suitable polyetherketoneketones are sold under the brand name KEPSTAN® supplied by Arkema.

In certain embodiments, the reinforcing additive can be one or more of a carbonaceous additive, a chopped fiber, dispersing agents, and an inorganic additive or mixtures thereof.

In certain embodiments, the additive can be present in an amount of from about 0.1% to about 70% by weight of the total composition of the resin. In certain embodiments, the additive can be present in an amount of from about 1% to about 60% by weight of the total composition of the resin. In certain embodiments, the additive can be present in an amount of from about 5% to about 50% by weight of the total composition of the resin of the precursor part after melt processing.

In certain embodiments, the reinforcing additive can be present in an amount of about 0.1%, 0.5%, 1%, 5%, 10%, 15%, 20%, 25%, 30%, 35%, 40%, 45%, 50%, 55%, 60%, 65%, 70%, or any ranges between the specified values, based on the weight of the total composition of the resin of the precursor part after melt processing.

In certain embodiments, the reinforcing additive can be a carbonaceous additive. In certain embodiments, the carbonaceous additive can be one or more of carbon fiber, carbon nanotubes, graphite, graphene, carbon whisker, a fullerene, carbon black, carbon flake, and buckyballs and mixtures thereof. In certain embodiments, the carbonaceous additive can be aligned by shear from the melt processing.

In certain embodiments, the carbonaceous additive can have a length of from about 0.1 mm to 10 mm, from about 0.5 mm to 9 mm, or from about 1 mm to 8 mm. In certain embodiments, the carbonaceous additive can have a length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the carbonaceous additive can have a diameter of from about 0.1 μm to 10 μm, from about 0.5 μm to 9 μm, or from about 1 μm to 8 μm. In certain embodiments, the carbonaceous additive can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values. The length of additive can be measured via optical microscopy before melt compounding. The diameter of additive can be measured via scanning electron microscopy.

In certain embodiments, the reinforcing additive can be a chopped fiber. In certain embodiments, the chopped fiber comprises one or more of carbon, glass, silica, boron, natural fibers, and polymeric fibers and mixtures thereof. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane, and mixtures thereof.

In certain embodiments, the chopped carbon fiber can have a fiber length of from about 0.1 mm to 10 mm, from about 0.5 mm to 9 mm, or from about 1 mm to 8 mm. In certain embodiments, the chopped carbon fiber can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the chopped carbon fiber can have a diameter of from about 0.1 μm to 10 μm, from about 0.5 μm to 9 μm, or from about 1 μm to 8 μm. In certain embodiments, the chopped carbon fiber can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values. The length of additive can be measured via optical microscopy before melt compounding. The diameter of additive can be measured via scanning electron microscopy.

One preferred embodiment is directed to chopped carbon fiber at a loading level of 10-45%, or 15-40%, or 20-35% as measured by weight in a PEKK matrix having a T:1 ratio of 55:45 to 85:15.

In certain embodiments, the reinforcing additive can be an inorganic additive. In certain embodiments, the inorganic additive can be one or more of a group IV, V, or VI carbide, silicides, boride, and nitride. In certain embodiments, the inorganic additive can be in powder form. In certain embodiments, the average particle size of the powder can be from about 0.01 µm to 500 µm, from about 0.1 µm to 250 µm, from about 1 µm to 100 µm, or from about 2 µm to 50 µm. In certain embodiments, the average particle size of the powder can be 0.01 µm, 0.1 µm, 0.5 µm, 1 µm, 5 µm, 10 µm, 15 µm, 20 µm, 25 µm, 30 µm, 40 µm, 50 µm, 75 µm, 100 µm, 250 µm, 500 µm, or any ranges between the specified values.

In certain embodiments, the reinforcing additive can comprise a dispersing agent. By dispersing agent is meant any moiety that improves separation of additives/particles and/or prevents clumping or settling. In certain embodiments, the dispersing agent can be an organosilicate, oganozirconate, organoaluminate, or oraganotitanate. In certain embodiments, dispersing agent can have an average particle size of from about 1 nm to 500 nm, from about 2 nm to 250 nm, or from 3 nm to 100 nm. In certain embodiments, dispersing agent can have an average particle size of about 1 nm, 2 nm, 3 nm, 5 nm, 10 nm, 15 nm, 20 nm, 25 nm, 30 nm, 40 nm, 50 nm, 75 nm, 100 nm, 250 nm, 500 nm, or any ranges between the specified values. Particle size can be determined by scanning electron microscopy of the dispersing agent before melt compounding.

In certain embodiments, during the pyrolyzing, a temperature within a chamber can increase at a rate of from about 1° C./h to about 20° C./h up to a peak temperature of about 1000° C. In certain embodiments, during the pyrolyzing the temperature within the chamber can increase at a rate of from about 3° C./h to about 17° C./h. In certain embodiments, during the pyrolyzing, the temperature within the chamber can increase at a rate of from about 5° C./h to about 15° C./h. In certain embodiments, pyrolysis conditions during pyrolyzing step b. are the same as the pyrolysis conditions during pyrolyzing step d. In certain embodiments, the pyrolysis conditions during pyrolyzing step b. are different than the pyrolysis conditions during pyrolyzing step d.

In certain embodiments, during the pyrolyzing, a temperature within a chamber can increase at a rate of from about 1° C./h, 2° C./h, 3° C./h, 4° C./h, 5° C./h, 6° C./h, 7° C./h, 8° C./h, 9° C./h, 10° C./h, 11° C./h, 12° C./h, 13° C./h, 14° C./h, 15° C./h, 16° C./h, 17° C./h, 18° C./h, 19° C./h, 20° C./h, or any ranges between the specified values.

In certain embodiments, the pyrolyzing optionally can comprise temperature holds during the pyrolysis at temperatures between 100° C. and 1000° C. In certain embodiments, the pyrolysis can be performed under nitrogen, argon, or forming gas (mixture of hydrogen and nitrogen). In certain embodiments, the pyrolyzing occurs in a graphite bed. In certain embodiments, the temperature holds during the pyrolysis can be from about 1 h to 72 h, from about 2 h to 48 h, or from about 3 h to 24 h. In certain embodiments, the temperature holds (i.e., is maintained) during the pyrolysis can be about 1 h, 2 h, 3 h, 4 h, 5 h, 6 h, 7 h, 8 h, 9 h, 10 h, 12 h, 16 h, 20 h, 24 h, 30 h, 36 h, 42 h, 48 h, 54 h, 60 h, 66 h, 72 h, or any ranges between the specified values.

In certain embodiments, the liquid second resin comprises, consists essentially of, or consists of one or more of pitch, benzoxazines, furfural, polyester, vinylester, acrylic, and phenolics. In certain embodiment, the liquid second resin comprises, consists essentially of, or consist of pitch, phenolics or combination thereof.

In certain embodiments, the method comprises repeating infusing step c. and pyrolyzing step d. at least one time. In certain embodiments, the method comprises repeating infusing step c. and pyrolyzing step d. at least two, three, four, five, or more times. In certain embodiments the char yield after a first pyrolysis cycle or after two, three, four, five, or more times can be greater than 65%, greater than 70%, greater than 75%, greater than 80%, greater than 85%, greater than 90%, or greater than 95% or more.

In certain embodiments, the method comprises repeating infusing step c. and pyrolyzing step d. until the carbon carbon composite, carbon ceramic matrix composite, or carbon silica composite is at least about 75% solid, 80% solid, 85% solid, 90% solid, 95% solid, or 99% solid as determined according to Example 1.

In certain embodiments, the method comprises repeating steps c. through d. one or more times.

Method Comprising Aligned Additives

In certain embodiments, the present disclosure is directed to a method for preparing a carbon-carbon composite, a carbon ceramic matrix composite, or a carbon silica composite.

In certain embodiments, the method for preparing a carbon-carbon composite, a carbon ceramic matrix composite, or a carbon silica composite comprises:
- a1) processing aligned reinforcing additives and a resin comprising a polyaryletherketone (PAEK) to make an aligned reinforcing additives PAEK, aligned 1-2 dimensional flake material, or aligned 1-2 dimensional platelet material, to create a fabric, prepreg, or tape comprising the aligned reinforcing additives and impregnated PAEK,
- a2) processing the PAEK tape, prepreg, or fabric via hand-layup, automated tape placement, 3D printing, r filament winding, or needle punching or other methods of Z-axis reinforcement followed by compression molding, vacuum bag consolidation, autoclave consolidation, in-situ consolidation to make a precursor object,
- c. pyrolyzing the object to make a pyrolyzed object,
- d. infusing a liquid second resin into the pyrolyzed object to make an infused object, and
- e. pyrolyzing the infused object to make the carbon carbon composite, the carbon ceramic matrix composite, or the carbon silica composite, and
- f. optionally repeating steps c. through d. one or more times.

In certain embodiments, the present disclosure is directed to the carbon carbon composite, carbon ceramic matrix composite, or carbon silica composite made by the method above.

In certain embodiments, the method comprises processing aligned reinforcing additives and a resin comprising a polyaryletherketone (PAEK) to make an aligned reinforcing additives PAEK. In certain embodiments, the method comprises processing aligned reinforcing additives and a resin comprising a polyaryletherketone (PAEK) to make an aligned 1-2 dimensional flake material. In certain embodiments, the method comprises processing aligned reinforcing additives and a resin comprising a polyaryletherketone (PAEK) to make an aligned 1-2 dimensional platelet material. In certain embodiments, the aligned 1-2 dimensional flake material or aligned 1-2 dimensional platelet material can be graphite, graphene, or whiskers.

In certain embodiments, the 1-2 dimensional flake material or 1-2 dimensional platelet material can have a diameter of from about 0.1 mm to 10 mm, from about 0.5 mm to 9 mm, or from about 1 mm to 8 mm. In certain embodiments, the 1-2 dimensional flake material or 1-2 dimensional platelet material can have a diameter of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the 1-2 dimensional flake material or 1-2 dimensional platelet material can have a thickness of from about 0.001 mm to 0.1 mm, from about 0.005 mm to 0.09 mm, or from about 0.01 mm to 0.08 mm. In certain embodiments, the 1-2 dimensional flake material or 1-2 dimensional platelet material can have a thickness of about 0.001 mm, 0.005 mm, 0.01 mm, 0.02 mm, 0.03 mm, 0.04 mm, 0.05 mm, 0.06 mm, 0.07 mm, 0.08 mm, 0.09 mm, 0.1 mm, and any ranges between the specified values. Measurements can be obtained from optical or scanning electron microscopy imaging before melt compounding.

In certain embodiments, the processing can create a fabric comprising the aligned reinforcing additives and impregnated PAEK. In certain embodiments, the processing can create a prepreg comprising the aligned reinforcing additives and impregnated PAEK. In certain embodiments, the processing can create a tape comprising the aligned reinforcing additives and impregnated PAEK.

In certain embodiments, the aligned reinforcing additives can be made by stretching unidirectional tape until the fibers are broken, subjecting the fibers to fluid flow to align the fibers, or subjecting the fibers to electro-magnetic fields to align the fibers. In certain embodiments, the aligned reinforcing additives can be made by stretching unidirectional tape until the fibers are broken (either before or after impregnation with PAEK resin). In a preferred embodiment the fibers are aligned by fluid flow onto a porous belt to create a mat of aligned fibers as described in U.S. Pat. No. 10,669,659.

In certain embodiments, the aligned reinforcing additives can be one or more of carbon, glass, silica, boron, natural fibers, polymeric fibers, carbon nanotubes, graphite, graphene, and carbon or ceramic whiskers. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane.

In certain embodiments, the aligned reinforcing additive can have a length of from about 0.1 mm to 10 mm, from about 0.5 mm to 9 mm, or from about 1 mm to 8 mm. In certain embodiments, the aligned reinforcing additive can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values.

In certain embodiments, the PAEK can be one or more of polyetherketoneketone (PEKK), polyetheretherketone (PEEK), polyetheretherketone-poly(ether diphenyl ether ketone) (PEEK-PEDEK), polyetherketone (PEK), polyetherketone (PEK), and polyetherketonetherketoneketone (PEKEKK). In certain embodiments, the PAEK can be PEKK. In some embodiments, PEKK is preferred. In other embodiments PEEK is preferred.

In one embodiment, the poly(aryl ketone) comprises, consists essentially of, or consists of polyetherketoneketone (PEKK). Polyetherketoneketones suitable for use in the present invention may comprise or consist essentially of repeating units represented by the following formulas I and II:

I

II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio can be easily varied as can be desired to achieve a certain set of properties, e.g., by varying the relative amounts of the different monomers used to make the polyetherketoneketone.

Generally speaking, a polyetherketoneketone having a relatively high Formula I:Formula II ratio will be more crystalline than a polyetherketoneketone having a lower Formula I:Formula II ratio. Thus, the T:I ratio can be adjusted to provide an amorphous (non-crystalline) polyetherketoneketone or a more crystalline polyetherketoneketone, as desired. In one embodiment, a polyetherketoneketone having a T:I isomer ratio of from about 50:50 to about 90:10 can be employed. In some embodiments polyetherketoneketones can have a T:I isomer ratio of from about 55:45 to about 85:15, from about 60:40 to about 80:20, from about 65:35 to about 75:25, about 70:30, or at any ranges between the specified ranges.

In certain embodiments, the in-situ consolidation can contain rolling to apply pressure and/or heat.

In certain embodiments, during the pyrolyzing, a temperature within a chamber can increase at a rate of from about 1° C./h to about 20° C./h up to a peak temperature of about 1000° C. In certain embodiments, during the pyrolyzing, the temperature within the chamber can increase at a rate of from about 3° C./h to about 17° C./h. In certain embodiments, during the pyrolyzing, the temperature within the chamber can increase at a rate of from about 5° C./h to about 15° C./h. In certain embodiments, the pyrolysis conditions during pyrolyzing step c. are the same as the pyrolysis conditions during pyrolyzing step e. In certain embodiments, the pyrolysis conditions during pyrolyzing step c. are different than the pyrolysis conditions during pyrolyzing step e.

In certain embodiments, during the pyrolyzing, a temperature within a chamber can increase at a rate of from about 1° C./h, 2° C./h, 3° C./h, 4° C./h, 5° C./h, 6° C./h, 7° C./h, 8° C./h, 9° C./h, 10° C./h, 11° C./h, 12° C./h, 13° C./h, 14° C./h, 15° C./h, 16° C./h, 17° C./h, 18° C./h, 19° C./h, 20° C./h, or any ranges between the specified values.

In certain embodiments, the pyrolyzing optionally can comprise temperature holds during the pyrolysis. In certain embodiments, the pyrolysis can be performed under nitrogen, argon, or forming gas. In certain embodiments, the pyrolyzing occurs in a graphite bed. In certain embodiments, the temperature holds during the pyrolysis can be from about 1 h to 72 h, from about 2 h to 48 h, or from about 3 h to 24 h. In certain embodiments, the temperature holds during the pyrolysis can be about 1 h, 2 h, 3 h, 4 h, 5 h, 6 h, 7 h, 8 h, 9 h, 10 h, 12 h, 16 h, 20 h, 24 h, 30 h, 36 h, 42 h, 48 h, 54 h, 60 h, 66 h, 72 h, or any ranges between the specified values.

In certain embodiments, the precursor object can be melt formed after the processing step a. but before the pyrolyzing step c.

In certain embodiments, the liquid second resin can be one or more of pitch, benzoxazines, furfural, polyester, vinylester, acrylic, and phenolics. In certain embodiments, pitch, phenolics, or combination there are preferred.

In certain embodiments, the method comprises repeating infusing step d. and pyrolyzing step e. at least one time. In certain embodiments, the method comprises repeating infusing step d. and pyrolyzing step e. at least two, three, four, or five times. In certain embodiments the char yield after a first pyrolysis cycle or after two, three, four, five, or more times can be greater than 65%, greater than 70%, greater than 75%, greater than 80%, greater than 85%, greater than 90%, or greater than 95% or more.

In certain embodiments, the method comprises repeating infusing step d. and pyrolyzing step e. until the carbon carbon composite, carbon ceramic matrix composite, or carbon silica composite is at least about 75% solid, 80% solid, 85% solid, 90% solid, 95% solid, or 99% solid.

In certain embodiments, steps c. through d. are repeated one or more times.

Method Comprising Impregnating or Co-Weaving

In certain embodiments, the present disclosure is directed to a method for making a carbon-carbon composite, a carbon ceramic matrix composite, or a carbon silica composite.

In certain embodiments, the method for making a carbon carbon composite, a carbon ceramic matrix composite, or a carbon silica composite comprises:
- a1) impregnating a continuous fiber tape or fabric with a resin comprising a polyaryletherketone (PAEK) and at least one reinforcing additive to make a filled PAEK tape or fabric or co-weaving a continuous fiber or fabric with a PAEK fiber comprising PAEK and the at least one reinforcing additive to make a filled PAEK tape or fabric,
- a2) processing the filled PAEK tape or fabric or co-woven PAEK/fiber material via hand-layup, automated tape placement, 3D printing, filament winding or needle punching or other methods of Z-axis reinforcement followed by compression molding, vacuum bag consolidation, autoclave consolidation, or in-situ consolidation to make a precursor part,
- c. pyrolyzing the precursor part to make a pyrolyzed part,
- d. infusing a liquid second resin into the pyrolyzed part to make an infused part, and
- e. pyrolyzing the infused part to make the carbon carbon composite, the carbon ceramic matrix composite, or the carbon silica composite.

In certain embodiments, the present disclosure is directed to the carbon carbon composite, carbon ceramic matrix composite, or carbon silica composite made by the method above.

In certain embodiments, the method comprises impregnating a continuous fiber tape or fabric with a resin comprising a polyaryletherketone (PAEK) and at least one additive to make a filled PAEK tape. In certain embodiments, the method comprises co-weaving a continuous fiber or fabric with a PAEK fiber comprising PAEK and at least one additive to make a filled PAEK tape or fabric.

In certain embodiments, the continuous fiber or fabric can be carbon fiber.

In certain embodiments, the PAEK can be one or more of polyetherketoneketone (PEKK), polyetheretherketone (PEEK), polyetheretherketone-poly(ether diphenyl ether ketone) (PEEK-PEDEK), polyetherketone (PEK) and polyetherketonetherketoneketone (PEKEKK). In certain embodiments, the PAEK can be PEKK.

In one embodiment, the poly(aryl ketone) comprises, consists essentially of, or consists of polyetherketoneketone (PEKK). Polyetherketoneketones suitable for use in the present invention may comprise or consist essentially of repeating units represented by the following formulas I and II:

I

II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio can be easily varied as can be desired to achieve a certain set of properties, e.g., by varying the relative amounts of the different monomers used to make the polyetherketoneketone.

Generally speaking, a polyetherketoneketone having a relatively high Formula I:Formula II ratio will be more crystalline than a polyetherketoneketone having a lower Formula I:Formula II ratio. Thus, the T:I ratio can be adjusted to provide an amorphous (non-crystalline) polyetherketoneketone or a more crystalline polyetherketoneketone, as desired. In one embodiment, a polyetherketoneketone having a T:I isomer ratio of from about 50:50 to about 90:10 can be employed. In some embodiments polyetherketoneketones can have a T:I isomer ratio of from about 55:45 to about 85:15, from about 60:40 to about 80:20, from about 65:35 to about 75:25, about 70:30, or at any ranges between the specified ranges.

In certain embodiments, the reinforcing additive can be one or more of a carbonaceous additive, a chopped fiber, dispersing agents, and an inorganic additive.

In certain embodiments, the additive can be present in an amount of from about 0.01% to about 30% by weight of the total composition of the resin. In certain embodiments, the additive can be present in an amount of from about 0.1% to about 25% by weight of the total composition of the resin. In certain embodiments, the additive can be present in an amount of from about 1% to about 20% by weight of the total composition of the resin.

In certain embodiments, the additive can be present in an amount of about 0.01%, 0.05%, 0.1%, 0.5%, 1%, 2%, 3%, 4%, 5%, 6%, 7%, 8%, 9%, 10%, 15%, 20%, 25%, 30%, or any ranges between the specified values, based on the weight of the total composition of the resin.

In certain embodiments, the additive can be a carbonaceous additive. In certain embodiments, the carbonaceous additive can be one or more of carbon fiber, carbon nanotubes, graphite, graphene, carbon whisker, a fullerene, carbon black, carbon flake, and buckyballs. In certain embodiments, the carbonaceous additive can be aligned by shear from the melt processing.

In certain embodiments, the carbonaceous additive can have a length of from about 0.1 mm to 10 mm, from about 0.5 mm to 9 mm, or from about 1 mm to 8 mm. In certain embodiments, the carbonaceous additive can have a length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the carbonaceous additive can have a diameter of from about 0.1 μm to 10 μm, from about 0.5 μm to 9 μm, or from about 1 μm to 8 μm. In certain embodiments, the carbonaceous additive can have a diameter of about 0.1 μm, 0.5 μm, 1 μm, 2 μm, 3 μm, 4 μm, 5 μm, 6 μm, 7 μm, 8 μm, 9 μm, 10 μm, and any ranges between the specified values.

In certain embodiments, the additive can be a chopped fiber. In certain embodiments, the chopped fiber comprises one or more of carbon, glass, silica, boron, natural fibers, and polymeric fibers. In certain embodiments, the natural fibers can be one or more of cellulose, bamboo, hemp, and jute. In certain embodiments, the polymeric fibers can be one or more of polyamide, polyimides, polyaramid, polyurethane, polyester, and polyurethane.

In certain embodiments, the chopped carbon fiber can have a fiber length of from about 0.1 mm to 10 mm, from about 0.5 mm to 9 mm, or from about 1 mm to 8 mm. In certain embodiments, the chopped carbon fiber can have a fiber length of about 0.1 mm, 0.5 mm, 1 mm, 2 mm, 3 mm, 4 mm, 5 mm, 6 mm, 7 mm, 8 mm, 9 mm, 10 mm, and any ranges between the specified values. In certain embodiments, the chopped carbon fiber can have a diameter of from about 0.1 µm to 10 µm, from about 0.5 µm to 9 µm, or from about 1 µm to 8 µm. In certain embodiments, the chopped carbon fiber can have a diameter of about 0.1 µm, 0.5 µm, 1 µm, 2 µm, 3 µm, 4 µm, 5 µm, 6 µm, 7 µm, 8 µm, 9 µm, 10 µm, and any ranges between the specified values.

In certain embodiments, the additive can be an inorganic additive. In certain embodiments, the inorganic additive can be one or more of a group IV, V, or VI carbide, silicides, boride, and nitride. Carbides and silicides would be preferred with silicon carbide being the most preferred. In certain embodiments, the inorganic additive can be in powder form. In certain embodiments, the average particle size of the powder can be from about 0.01 µm to 500 µm, from about 0.1 µm to 250 µm, from about 1 µm to 100 µm, or from about 2 µm to 50 µm. In certain embodiments, the average particle size of the powder can be 0.01 µm, 0.1 µm, 0.5 µm, 1 µm, 5 µm, 10 µm, 15 µm, 20 µm, 25 µm, 30 µm, 40 µm, 50 µm, 75 µm, 100 µm, 250 µm, 500 µm, or any ranges between the specified values.

In certain embodiments, the additive can comprise a dispersing agent. In certain embodiments, the dispersing agent can be an organosilicate, organozirconate, organoaluminate, or organotitanate, with organosilicates and organotitanates being preferred and organosilicates being the most preferred. In certain embodiments, dispersing agent can have an average pore size of from about 1 nm to 500 nm, from about 2 nm to 250 nm, or from 3 nm to 100 nm. In certain embodiments, dispersing agent can have an average pore size of about 1 nm, 2 nm, 3 nm, 5 nm, 10 nm, 15 nm, 20 nm, 25 nm, 30 nm, 40 nm, 50 nm, 75 nm, 100 nm, 250 nm, 500 nm, or any ranges between the specified values.

In certain embodiments, the in-situ consolidation can contain rolling to apply pressure and/or heat.

In certain embodiments, during the pyrolyzing, a temperature within a chamber can increase at a rate of from about 1° C./h to about 20° C./h up to a peak temperature of about 1000° C. In certain embodiments, during the pyrolyzing, the temperature within the chamber can increase at a rate of from about 3° C./h to about 17° C./h. In certain embodiments, during the pyrolyzing, the temperature within the chamber can increase at a rate of from about 5° C./h to about 15° C./h. In certain embodiments, the pyrolysis conditions during pyrolyzing step c. are the same as the pyrolysis conditions during pyrolyzing step e. In certain embodiments, the pyrolysis conditions during pyrolyzing step c. are different than the pyrolysis conditions during pyrolyzing step e.

In certain embodiments, during the pyrolyzing, a temperature within a chamber can increases at a rate of from about 1° C./h, 2° C./h, 3° C./h, 4° C./h, 5° C./h, 6° C./h, 7° C./h, 8° C./h, 9° C./h, 10° C./h, 11° C./h, 12° C./h, 13° C./h, 14° C./h, 15° C./h, 16° C./h, 17° C./h, 18° C./h, 19° C./h, 20° C./h, or any ranges between the specified values.

In certain embodiments, the pyrolyzing optionally can comprise temperature holds during the pyrolysis. In certain embodiments, the pyrolysis can be performed under nitrogen, argon, or forming gas. In certain embodiments, the pyrolyzing occurs in a graphite bed. In certain embodiments, the temperature holds during the pyrolysis can be from about 1 h to 72 h, from about 2 h to 48 h, or from about 3 h to 24 h. In certain embodiments, the temperature holds during the pyrolysis can be about 1 h, 2 h, 3 h, 4 h, 5 h, 6 h, 7 h, 8 h, 9 h, 10 h, 12 h, 16 h, 20 h, 24 h, 30 h, 36 h, 42 h, 48 h, 54 h, 60 h, 66 h, 72 h, or any ranges between the specified values.

In certain embodiments, the precursor object can be melt formed after the processing step b. but before the pyrolyzing step c.

In certain embodiments, the liquid second resin can be one or more of pitch, benzoxazines, furfural, polyester, vinylester, acrylic, and phenolics.

In certain embodiments, the method comprises repeating infusing step d. and pyrolyzing step e. at least one time. In certain embodiments, the method comprises repeating infusing step d. and pyrolyzing step e. at least two, three, four, or five times or more. In certain embodiments the char yield after a first pyrolysis cycle or after two, three, four, five, or more times can be greater than 65%, greater than 70%, greater than 75%, greater than 80%, greater than 85%, greater than 90%, or greater than 95% or more.

In certain embodiments, the method comprises repeating infusing step d. and pyrolyzing step e. until the carbon carbon composite, carbon ceramic matrix composite, or carbon silica composite is at least about 75% solid, 80% solid, 85% solid, 90% solid, 95% solid, or 99% solid.

EXAMPLES

The method and products described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Pyrolysis of Carbon-Filled PAEK Resin

Several variations of the proposed invention were evaluated for char yield. Injection molded Tensile bars comprising neat resin (with varying T/I content from 60/40 to 80/20) and short strand chopped carbon fiber (0-40%) were analyzed ("Table 1"). The tensile bars consisting only of PEKK represented comparative examples, while the example with 40% chopped carbon fiber is of the invention.

TABLE 1

| Sample | T/I Ratio | Fiber Content |
| --- | --- | --- |
| COMP A | 60/40 | 0% |
| COMP B | 60/40 | 0% |
| COMP C | 72/28 | 0% |
| COMP D | 80/20 | 0% |
| EXAMPLE E | 80/20 | 40% |

All samples underwent the following pyrolysis cycle under an inert atmosphere (Nitrogen flowing at 10-15 LPM throughout) ("Table 2"):

| Step | Temperature (° C.) | Time (hours) |
| --- | --- | --- |
| 1 | 23-120 | 3 |
| 2 | 120 | 4 |
| 3 | 120-450 | 24 |
| 4 | 450 | 4 |
| 5 | 450-600 | 48 |
| 6 | 600 | 4 |

-continued

| Step | Temperature (° C.) | Time (hours) |
|---|---|---|
| 7 | 600-1000 | 30 |
| 8 | 1000 | 3 |
| | | Total Time: 120 |

Figure 1:
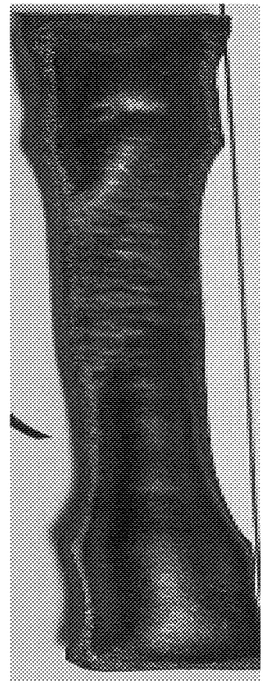
FIG. 1 depicts a PEKK sample with 40% chopped carbon fiber after initial pyrolysis having a char yield of 84%.

Char yield was calculated from the mass of each sample pre and post pyrolysis ("Equation 1"):

$$\text{char yield (\%)} = \frac{w_a}{w_b} \times 100$$

where $w_b$ and $w_a$ are the mass of the sample before and after pyrolysis respectively. Results are summarized below ("Table 3"). It can be seen that example E, shown in FIG. 1, which contains carbon fiber fillers and is of the invention, had significantly higher char yield than COMPARATIVE Examples A-D.

TABLE 3

| Sample | $w_b$ (g) | $w_a$ (g) | Char Yield (%) |
|---|---|---|---|
| COMP A | 10.3 | 6.9 | 67 |
| COMP B | 10.3 | 7.2 | 70 |
| COMP C | 10.6 | 7.4 | 70 |
| COMP D | 10.3 | 7.2 | 70 |
| EXAMPLE E | 11.5 | 9.7 | 84 |

What is claimed is:

1. A method for making a high temperature composite, which is a carbon carbon composite, a carbon ceramic matrix composite, or a carbon silica composite, comprising:
   a. making a precursor part from a resin comprising a polyaryletherketone (PAEK) and at least one reinforcing additive;
   b. pyrolyzing the precursor part to a pyrolyzed part, wherein during the pyrolyzing of the precursor part, a temperature within a chamber increases to a peak temperature of about 1000° C. or more, wherein said temperature within the chamber increases one or more times at a rate from 1° C./h to about 17° C./h during said pyrolyzing of the precursor part, and wherein optionally said pyrolyzing of the precursor part is maintained for a period of time at one or more temperatures;
   c. infusing a liquid second resin into the pyrolyzed part to make an infused part; and
   d. pyrolyzing the infused part to make the carbon carbon composite, the carbon ceramic matrix composite, or the carbon silica composite,
   e. optionally repeating steps c. through d. one or more times.

2. The method of claim 1, wherein the PAEK comprises one or more of polyetherketoneketone (PEKK), polyetheretherketone (PEEK), polyetheretherketone-poly (ether diphenyl ether ketone) (PEEK-PEDEK), polyetherketone (PEK), and polyetherketonetherketoneketone (PEKEKK).

3. The method according to claim 1, wherein the liquid second resin comprises one or more of pitch, benzoxazines, furfural, polyester, vinylester, acrylic, and phenolics.

4. The method according to claim 1, wherein the precursor part is made by melt processing the resin comprising a polyaryletherketone (PAEK) and the at least one reinforcing additive.

5. The method according to claim 1, wherein the reinforcing additive comprises one or more of a carbonaceous additive, a chopped fiber, an inorganic additive, or mixtures thereof.

6. The method according to claim 1, wherein during the pyrolyzing of the infused part, a temperature within a chamber increases to a peak temperature of about 1000° C. or more, wherein said temperature within the chamber increases one or more times at a rate from 1° C./h to about 20° C./h during said pyrolyzing of the infused part, and wherein optionally said pyrolyzing of the infused part is maintained for a period of time at one or more temperatures.

7. The method according to claim 1, wherein the method achieves a char yield of at least 80%.

8. A method for making a high temperature composite, which is a carbon carbon composite, a carbon ceramic matrix composite, or a carbon silica composite, comprising:
   a) making a precursor part from a resin comprising a polyaryletherketone (PAEK) and at least one reinforcing additive;
   b) initially pyrolyzing the precursor part to a pyrolyzed part, wherein during the pyrolyzing of the precursor part, a temperature within a chamber increases to a peak temperature of about 1000° C. or more, wherein said temperature within the chamber increases one or more times at a rate from 1° C./h to about 20° C./h during said pyrolyzing of the precursor part, and wherein optionally said pyrolyzing of the precursor part is maintained for a period of time at one or more temperatures.

9. The method according to claim 8, wherein the PAEK comprises one or more of polyetherketoneketone (PEKK), polyetheretherketone (PEEK), polyetheretherketone-poly (ether diphenyl ether ketone) (PEEK-PEDEK), polyetherketone (PEK), and polyetherketonetherketoneketone (PEKEKK).

10. The method according to claim 8, wherein the precursor part is made by melt processing the resin comprising a polyaryletherketone (PAEK) and the at least one reinforcing additive.

11. The method according to claim 8, wherein the precursor part of step (a) is made by:
   a1) impregnating a continuous fiber tape or fabric with the resin comprising a polyaryletherketone (PAEK) and the at least one reinforcing additive to make a filled PAEK tape or fabric, or co-weaving a continuous fiber or fabric with a PAEK fiber comprising PAEK and the at least one reinforcing additive to make a filled co-woven PAEK fiber or fabric; and
   a2) processing the filled PAEK tape or fabric or co-woven PAEK fiber or fabric via one or more the following methods: hand-layup, automated tape placement, 3D printing, filament winding, needle punching, and other methods of Z-axis reinforcement followed by one or more compression molding, vacuum bag consolidation, autoclave consolidation, and in-situ consolidation, to make the precursor part.

12. The method according to claim 8, wherein the at least one reinforcing additive is an aligned reinforcing additive, wherein the precursor part of step (a) is made by:
   a1) processing the aligned reinforcing additive and the resin comprising a polyaryletherketone (PAEK) to make an aligned reinforcing additive PAEK, aligned flake material, or aligned platelet material, to make a fabric, prepreg, or tape comprising the aligned reinforcing additive and impregnated PAEK; and a2) processing the PAEK tape, prepreg, or fabric via one or more of the following methods: hand-layup, automated tape placement, 3D printing, filament winding, needle punching and other methods of Z-axis reinforcement followed by one or more of compression molding, vacuum bag consolidation, autoclave consolidation, and in-situ consolidation to make the precursor part.

13. The method according to claim 8, wherein the reinforcing additive comprises one or more of a carbonaceous additive, a chopped fiber, an inorganic additive, or mixtures thereof.

14. The method according to claim 8, wherein the reinforcing additive comprises a carbonaceous additive being one or more of carbon fiber, carbon nanotubes, graphite, graphene, carbon whisker, a fullerene, carbon black, carbon flake, buckyballs, and mixtures thereof.

15. The method according to claim 8, wherein the reinforcing additive comprises a chopped fiber being one or more of carbon, glass, silica, boron, natural fibers, polymeric fibers, and mixtures thereof.

16. The method according to claim 8, wherein the reinforcing additive comprises an inorganic additive being one or more of a carbide, silicide, boride, or nitride of an element from group IV, V, or VI, and/or ceramic whiskers.

17. The method according to claim 8, wherein the precursor part comprises a dispersing agent being an organosilicate, organozirconate, organoaluminate, or organotitanate.

18. The method according to claim 8, wherein said pyrolyzing of the precursor part is maintained for a period of time at one or more temperatures.

* * * * *